US006915298B1

(12) United States Patent
Cain et al.

(10) Patent No.: US 6,915,298 B1
(45) Date of Patent: Jul. 5, 2005

(54) USER-DEFINED RELATIONSHIPS FOR DIAGRAMMING USER-DEFINED DATABASE RELATIONS

(75) Inventors: Michael W. Cain, Rochester, MN (US); Peter John Johnson, Rochester, MN (US); Kenton R. Milligan, Rochester, MN (US); Michael Donald Pfeifer, Dodge Center, MN (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 09/500,648

(22) Filed: Feb. 9, 2000

(51) Int. Cl.[7] ............................................. G06F 17/00
(52) U.S. Cl. ..................... 707/100; 707/104.1; 345/968
(58) Field of Search ......................... 707/3, 100–104.1, 707/103 R; 345/968

(56) References Cited

U.S. PATENT DOCUMENTS

| | | | | |
|---|---|---|---|---|
| 5,499,371 A | * | 3/1996 | Henninger et al. | 707/102 |
| 5,548,749 A | * | 8/1996 | Kroenke et al. | 707/102 |
| 5,572,639 A | * | 11/1996 | Gantt | 345/651 |
| 5,604,899 A | * | 2/1997 | Doktor | 707/3 |
| 5,717,924 A | * | 2/1998 | Kawai | 707/101 |
| 5,995,973 A | * | 11/1999 | Daudenarde | 707/1 |
| 6,122,641 A | * | 9/2000 | Williamson et al. | 707/101 |
| 6,151,031 A | * | 11/2000 | Atkins et al. | 345/440 |
| 6,226,630 B1 | * | 5/2001 | Billmers | 345/968 |
| 6,324,541 B1 | * | 11/2001 | de l'Etraz et al. | 705/10 |

OTHER PUBLICATIONS

Mullery, Geoff, "Tool Support for Multiple Viewpoints", SIGSOFT 96 Workshop, San Francisco, CA, pp 227–231.*
NB9209266, "Segmented Pointer Control for Personal Computer Display", IBM Technical Disclosure Bulletin, Sep. 1992, PP 266–268.*

* cited by examiner

Primary Examiner—Greta Robinson
Assistant Examiner—S R Pannala
(74) Attorney, Agent, or Firm—Lawrence D. Maxwell; Grant A. Johnson

(57) ABSTRACT

A schema diagrammer aids a database administrator or other user in maintaining and managing a database in a computer system. The schema diagrammer allows the user to define "user-defined relationships" between objects in the database. The schema diagrammer generates a graphical schema diagram or map that indicates the objects and their relationships to one another. The relationships that are displayed include both the formal relationships defined programmatically by the database itself and the user-defined relationships.

16 Claims, 11 Drawing Sheets

FIG. 4A

User Defined Relationship RCHASP04

Name: JoinPGM1 — 78

Description: — 80

Select objects in relationship: — 76

| | Name | Library | Type | Description |
|---|---|---|---|---|
| ☑ | F1 | PJJ | TB | |
| ☐ | G1 | PJJ | VW | |
| ☐ | G2 | PJJ | VW | |
| ☐ | G3 | PJJ | VW | |
| ☑ | F2 | PJJ | TB | |

A

USER-DEFINED RELATIONSHIPS FOR DIAGRAMMING USER-DEFINED DATABASE RELATIONS

CROSS-REFERENCE TO RELATED APPLICATION

"APPARATUS AND METHOD FOR GENERATING AND DISPLAYING A SCHEMA DIAGRAM FOR A DATABASE" is related and is incorporated herein by this reference in its entirety.

BACKGROUND OF THE INVENTION

1. Field of the Invention

The present invention relates generally to computer databases and, more specifically, to database schema visualization.

2. Description of the Related Art

Businesses commonly need to store and access large quantities of data relating to specific business matters, such as their financial accounts, inventory, customers, employees and other matters. Businesses use computer databases to aid this task. A database is a structure in which a computer system may store a large quantity of data organized in a manner that facilitates efficient storage, search and retrieval. A business typically charges a person known as a database administrator with the maintenance and management of the database.

Physically, at the heart of any database is some suitable type of non-volatile data store, such as magnetic disks, on which data may be recorded. Nothwithstanding this commonality, a number of different conceptual models under which databases can be constructed have been developed. The most prevalent database model is known as a relational database. In a relational database the data are organized in tables, also referred to as relations. Each data element in a table is indexed by its row and column in the table. Certain columns may be designated as "keys" to uniquely identify that row. Tables can be linked to other tables by means of a "foreign key" relationship and by means of a "join" relationship. Tables can also be related to other tables by means of a "view." A "view over a table" refers to permitting access to only a portion of the table.

The "schema" of a database is its structure and organization, including the various tables, views and their relationships to one another. Database administrators as well as programmers and other persons involved in the maintenance and management of a database typically find it helpful to be able to visualize the schema For many years, tables were the only human-readable form in which databases were available. It is difficult to understand a database schema merely by viewing its tables. Recently, graphical user interfaces (GUIs) for database schema visualization have been suggested. For example, a visualization tool for database schema is described in co-pending application Ser. No. 09/351,793, filed Jul. 13, 1999, entitled "APPARATUS AND METHOD FOR GENERATING AND DISPLAYING A SCHEMA DIAGRAM FOR A DATABASE." This tool provides a GUI through which a user can access a database and instruct the tool to display the elements of the database together in a graphical, tree-like format, with selected icons representing tables, views and other elements defining the schema.

SUMMARY OF THE INVENTION

The present invention relates to a schema diagrammer, which aids a database administrator or other user in maintaining and managing a database in a computer system. The schema diagrammer allows the user to define "user-defined relationships" between objects in the database. The schema diagrammer generates a graphical schema diagram or map that indicates the objects and their relationships to one another. The relationships that are displayed include both the formal relationships defined programmatically by the database itself and the user-defined relationships. A user-defined relationship can perhaps best be understood by contrasting it with the more typical "formal" database relationship, which is defined programmatically. In contrast to such a relationship, a user-defined relationship is not programmatically defined but rather exists separately from the formal relationships from the perspective of the database engine. In other words, the user-defined relationships are stored separately from the formal relationships and are not accessible to the database engine in the manner of formal relationships. Thus, the user-defined relationships are transparent to the database engine and have no effect on how the database engine queries, modifies or otherwise operates upon the database files.

The graphical user interface of the schema diagrammer may query the database and, in response, display a list of objects from which the user can select for user-defined relationships. It may also display choices of icons or other graphical indicia from which a user can select to graphically represent the user-defined relationship when the schema diagram map is displayed. The graphical indicia can include a shape, a color or other parameters for such an icon. The user can name the relationship, and the name is displayed along with the icon.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1A:
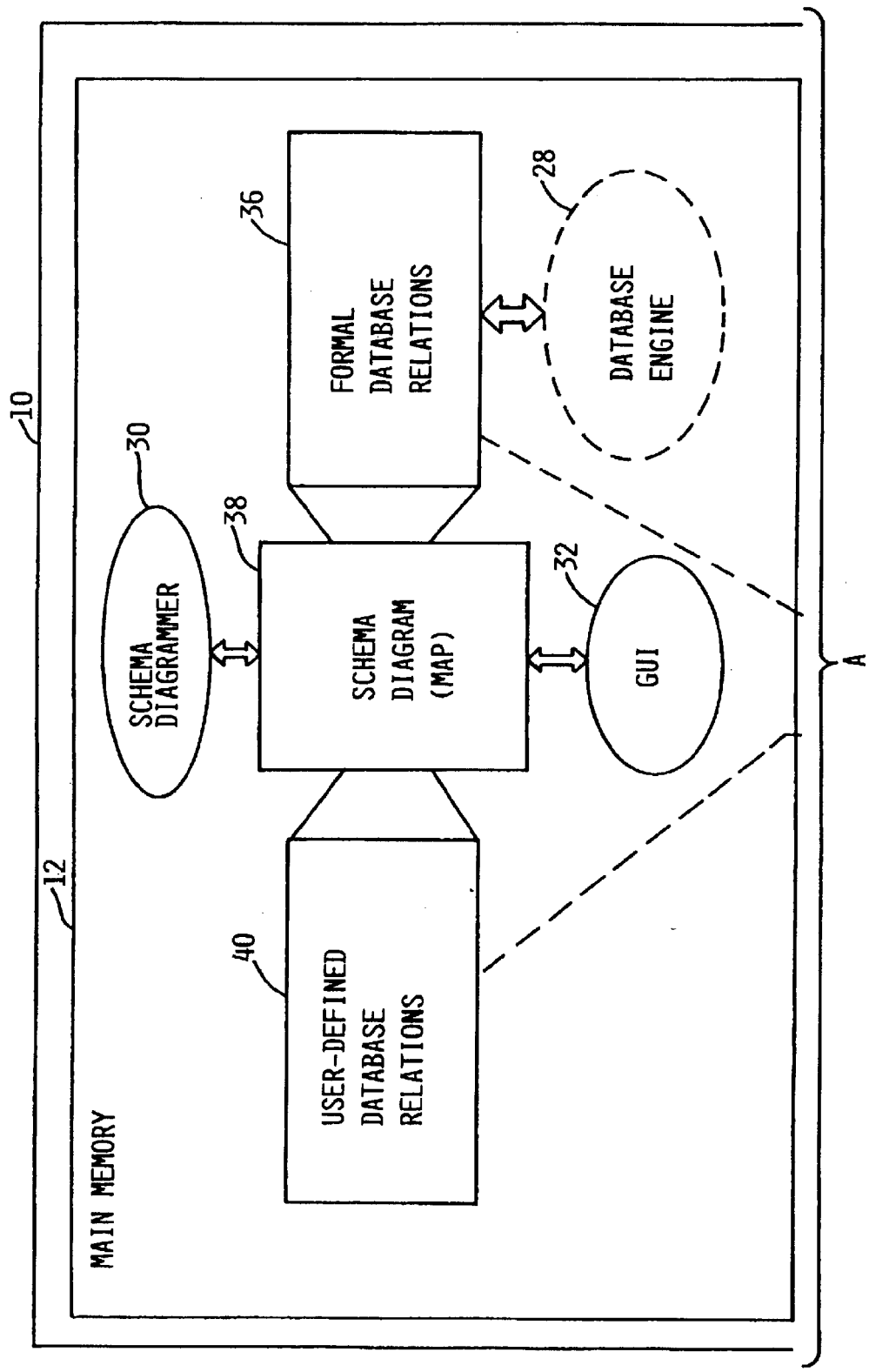
FIG. 1 is a block diagram of a computer system having a database and a schema diagrammer of the present invention.
Figure 1B:
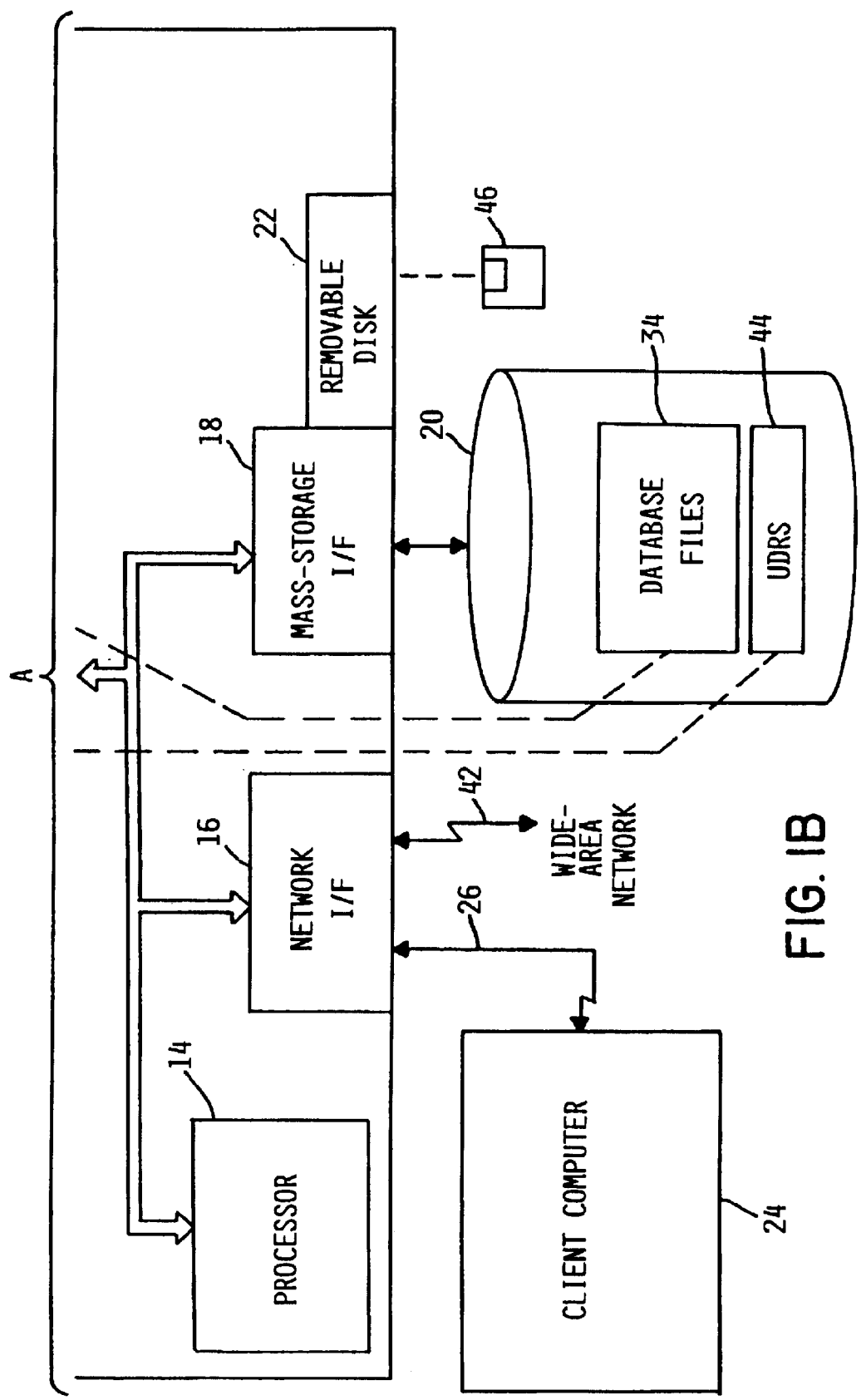

As illustrated in FIG. 1, a computer 10 includes a main memory 12, a processor 14, a network interface (I/F) 16 and a mass-storage interface 18. The system further includes non-volatile fixed disk storage 20, such as a magnetic hard disk drive, and non-volatile removable disk storage 22, such as a floppy disk drive. For illustrative purposes, this computer system is a client-server system, with a client computer 24 communicating with server computer 10 via a network such as a local area network (LAN) 26, but the present invention can be embodied within other computing system environments as well. Server computer 10 may be, for example, an IBM AS/400 computer.

Software elements executing in memory 12 include a database engine 28 and a schema diagrammer 30, which has a graphical user interface (GUI) 32. Database engine 28 is a software process that effects the storage to, retrieval from, and querying of a database in the conventional manner. Although the term "database" is often used to denote both a database engine and the database files upon which it operates, a distinction between them is made in this patent specification for purposes of clarity. Accordingly, the database files 34 upon which database engine 28 operates are illustrated separately as residing or stored in disk storage 20. As those persons skilled in the art to which the invention relates will understand, in actuality, database files 34 or portions of them may be retrieved into memory 12 from time to time under the control of database engine 28 or another program, such as a program (not shown) that facilitates maintenance of the database by a system administrator. Such portions of database files 34 are represented by the formal database relations 36 residing in memory 12. Formal database relations 36 are those that are defined programmatically in accordance with the operation of database engine 28. For example, they may include joins between database tables or other database elements and other relationships between those elements, such as views. In normal operation, database engine 28 provides the services that allow a user or another program to retrieve data from database files 34, store data in database files 34 and make queries to database files 34. As will be recognized by persons skilled in the art, formal database relations 36 define the structure of the database and thus affect how such storage, retrieval and querying is carried out. Absent formal database relations 36, from the perspective of database engine 28 the remainder of database files 34 would be little more than a collection of unrelated (and accordingly unusable) data. Formal database relations 36 are at the heart of the database.

With the exception of the user-defined relations functions to which this patent specification relates, schema diagrammer 30 is described in co-pending application Ser. No. 09/351,793, filed Jul. 13, 1999, entitled "APPARATUS AND METHOD FOR GENERATING AND DISPLAYING A SCHEMA DIAGRAM FOR A DATABASE." As described therein, through the use of its GUI 32 a user can cause schema diagrammer 30 to access database files 34 and retrieve formal database relations 36 among other data that describe and define the database elements. From this data, schema diagrammer 30 produces a graphical schema diagram or map 38. Although an example is described below, schema diagram map 38 shows the elements of the database together in a graphical, tree-like format, with selected icons representing tables, views and other elements defining the schema or structure of the database.

Another software element illustrated as residing in memory 12 is user-defined relations (UDRs) 40. In contrast to formal database relations 36, UDRs 40 do not have any operational effect upon database engine 28. Rather, they are created by a user through the use of schema diagrammer 30 for the purpose of aiding the user's understanding of the database or aiding the user in maintaining the database. For example, a database administrator may use a maintenance program that performs a join operation upon two tables; the tables are not actually joined from the perspective of database engine 28 but they are joined from the perspective of the user of the maintenance program. Thus, such a user may wish to see a graphical representation of such a join in a manner similar to that in which a user can see a graphical representation of the database schema (i.e., the database elements and formal relations). Such a user may operate the maintenance program remotely from computer 10 via client computer 24 or via still another computer (not shown) via a wide-area network 42 such as the Internet. The UDRs are preferably stored on disk 20 as UDR files 44 separate and distinct from database files 34. As described in further detail below, UDR files 44 may be part of the data that defines a previously-created schema diagram map. In any event, it should be evident from the above that the UDRs are not truly part of the database itself at all.

Although server computer 10 typically performs many tasks and accordingly has many software elements existing in memory 12 at any given time, for purposes of clarity only those that are directly related to the present invention are illustrated in FIG. 1. For example, server computer 10 has extensive and complex operating system software that is not shown, and may also be executing various tasks and processes relating to application programs not related to the database functions described herein. Furthermore, as should be apparent to persons of skill in the art, the illustrated software elements may not exist simultaneously or in their entirety in memory 12 at any given time.

Schema diagrammer 30 includes the program code that effects the method steps described in further detail below. In addition, it includes all of the program code that effects the methods described in the above-referenced co-pending patent application. The program code of schema diagrammer 30 can be delivered in the form of a program product for use on server 10 by means of a computer-usable data storage medium, such as a floppy disk 46 on which the code is magnetically recorded, or a computer-usable data transmission medium, such as a wide-area network 42 through which the code is electronically carried. It should also be noted that although the elements of the computer system (particularly server 10) are illustrated for purposes of clarity as co-located within a single electronic device or product, they can alternatively be distributed among a number of remotely located devices or products. For example, disk 20 can be at a different location from the remainder of the computer system, with the data communicated between them via a network connection.

Figure 2:
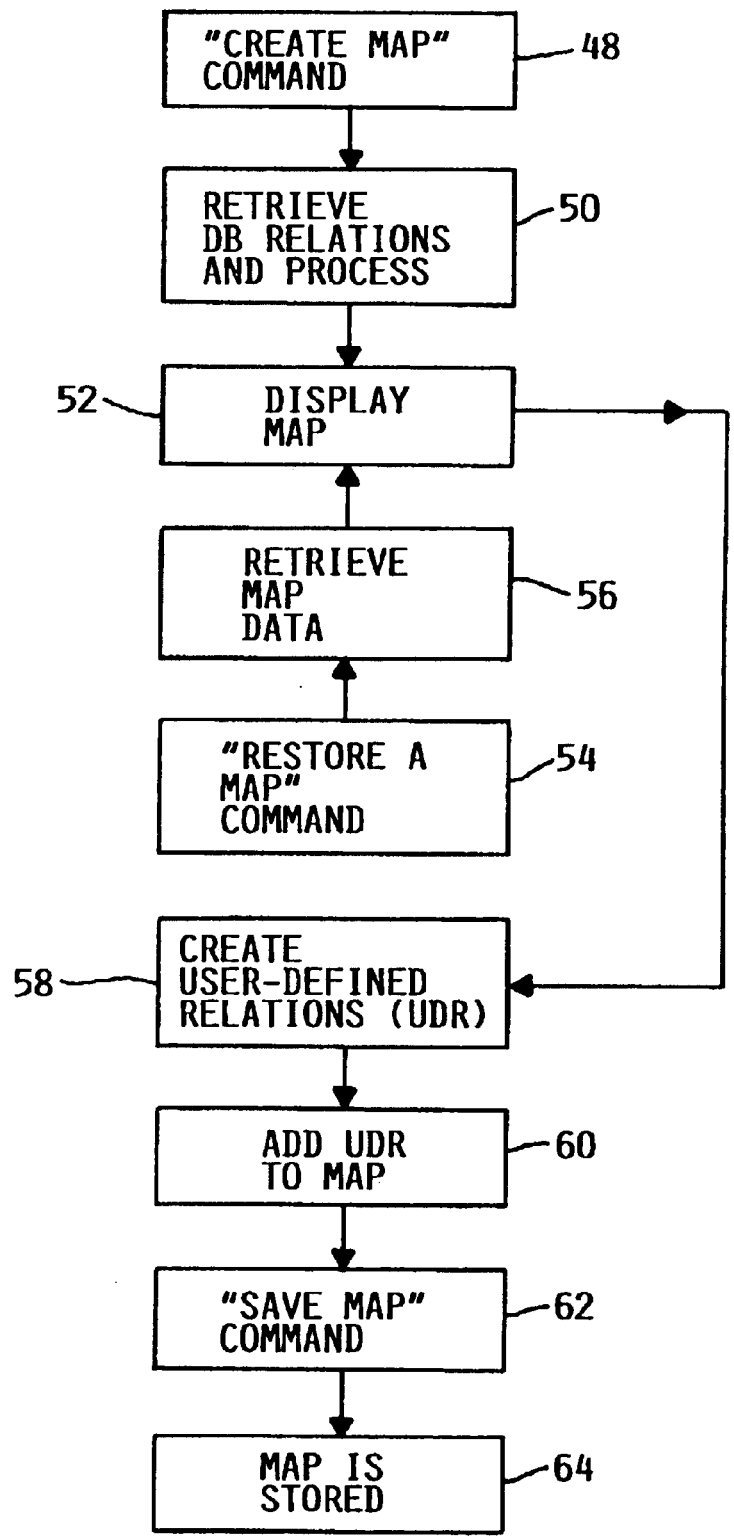
FIG. 2 is a flow chart illustrating the method for defining and adding to a schema diagram map user-defined relationships.

As illustrated in FIG. 2, the method of the present invention includes the following steps. Steps 48, 50 and 52 are described in the above-referenced co-pending application and are therefore not described in detail herein. At step 48, a user commands schema diagrammer 30 via GUI 32 to create schema diagram map 38. At step 50 schema diagrammer 30 retrieves formal database relations 36 and processes them to convert that data into a graphical format. At step 52 schema diagrammer 30 displays the resulting graphical schema diagram map 38. A user can also retrieve and display a previously-created map 38. At step 54, a user commands schema diagrammer 30 via GUI 32 to retrieve such a map 38, which schema diagrammer 30 does at step 56. Schema diagrammer 30 then displays the retrieved map 38 at step 52.

In addition to the above-described steps, a user can add UDRs to a previously-created map 38. Steps 58, 60, 62 and 64 relate to this function and are described in further detail below by means of exemplary screen displays provided by GUI 32. At step 58 a user commands schema diagrammer 30 via GUI 32 to create a UDR. At step 60 schema diagrammer 30 adds the UDR to map 38 and displays the updated map

38. The resulting or updated map 38 graphically represents a combination of both formal database relations 36 and user-defined database relations 40. In other words, some of the icons represent formal database relations 36, and others represent UDRs 40. At step 62 the user can command schema diagrammer 30 via GUI 32 to save the updated map 38, which occurs at step 64. As noted above, UDRs 40 are saved or stored on disk 20 as UDR files 44 separately from the database files 34.

Figure 3A:
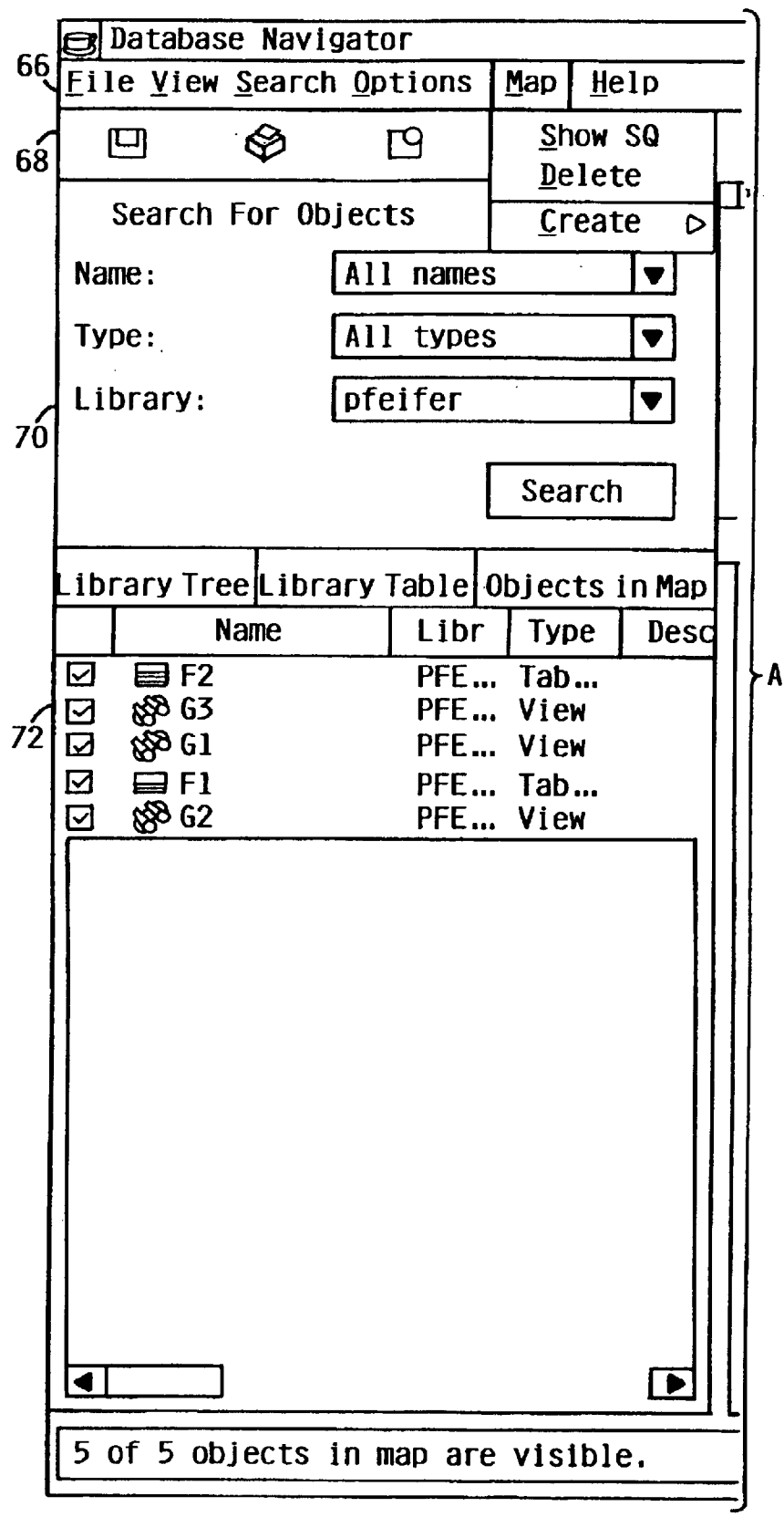
FIG. 3 illustrates the graphical user interface of the schema diagrammer.
Figure 3B:
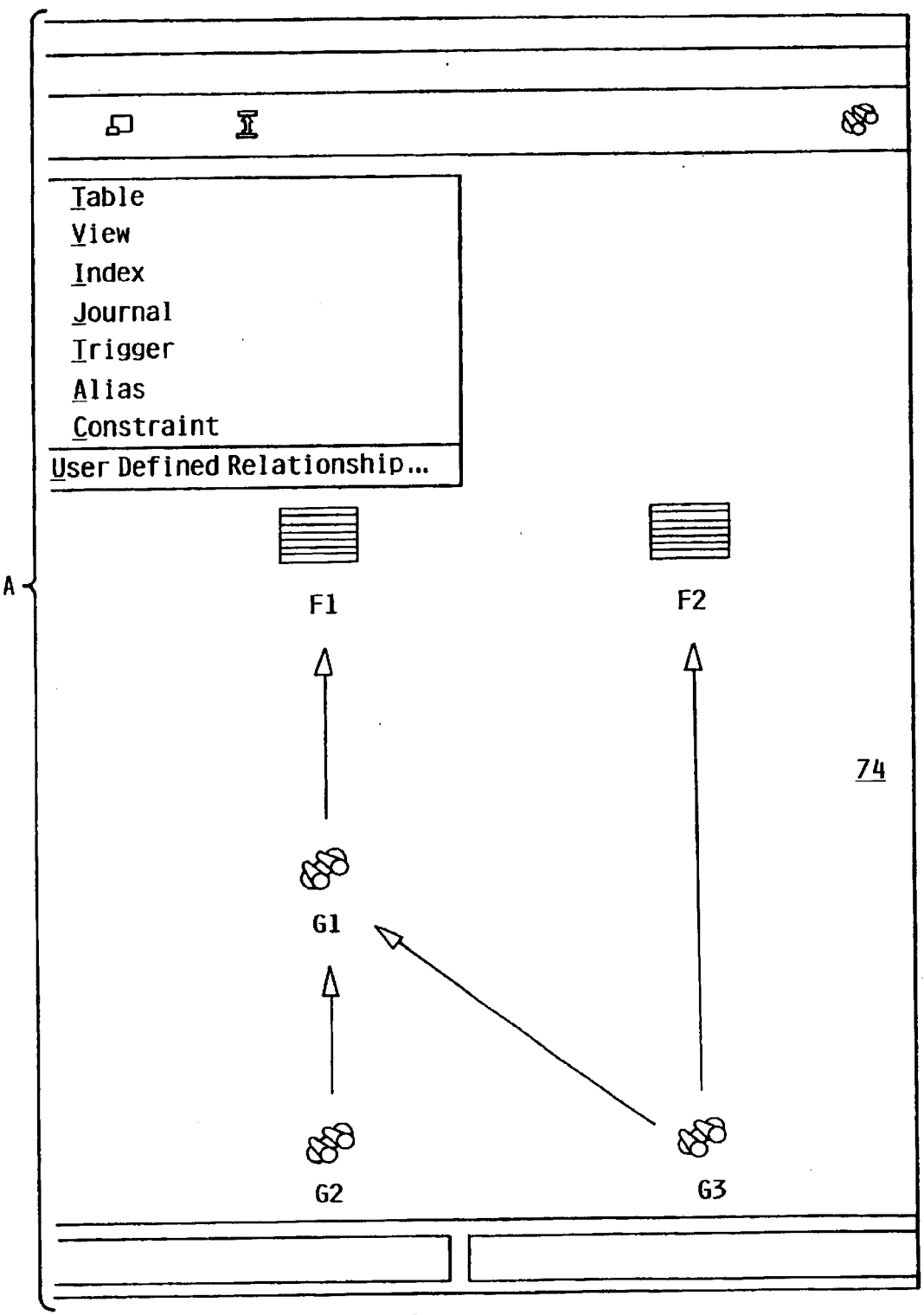
Figure 4B:
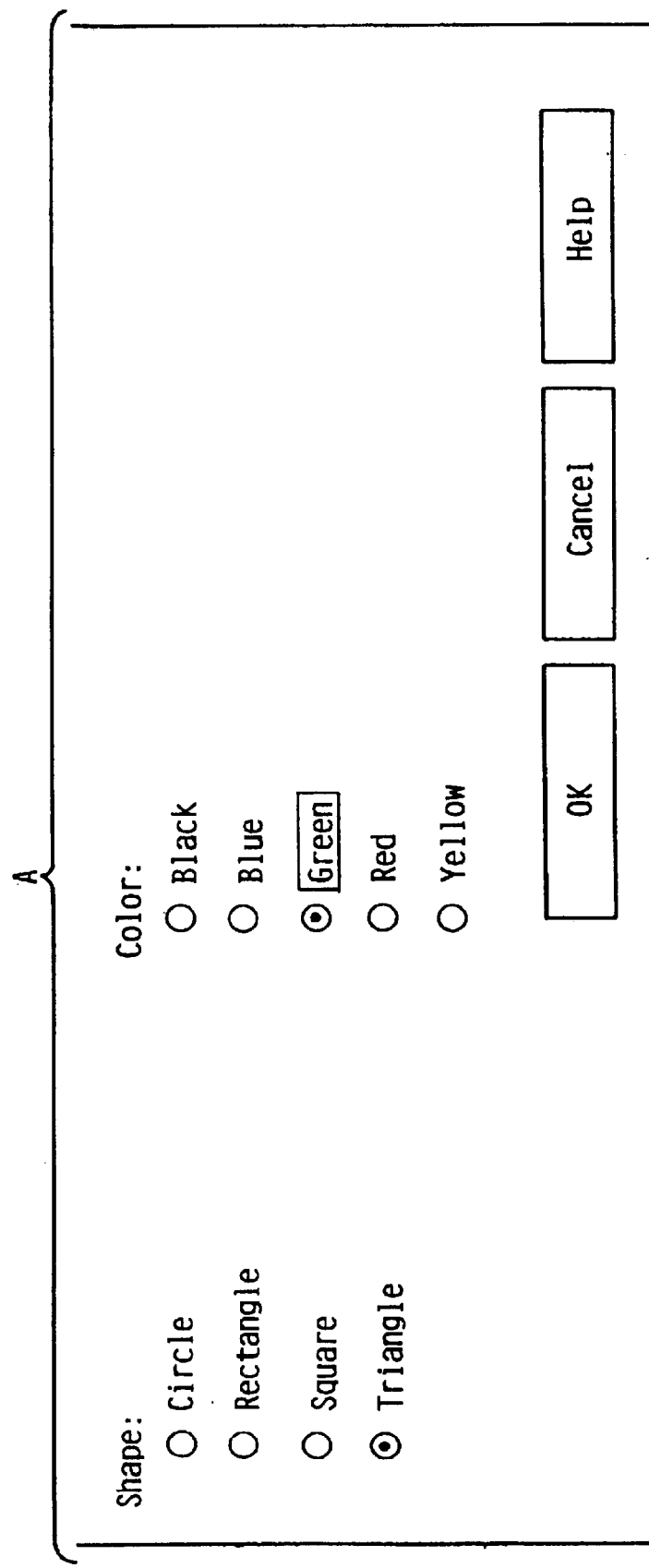
FIG. 4 illustrates using the graphical user interface to define a user-defined relationship, including selecting a name and an icon.
Figure 5A:
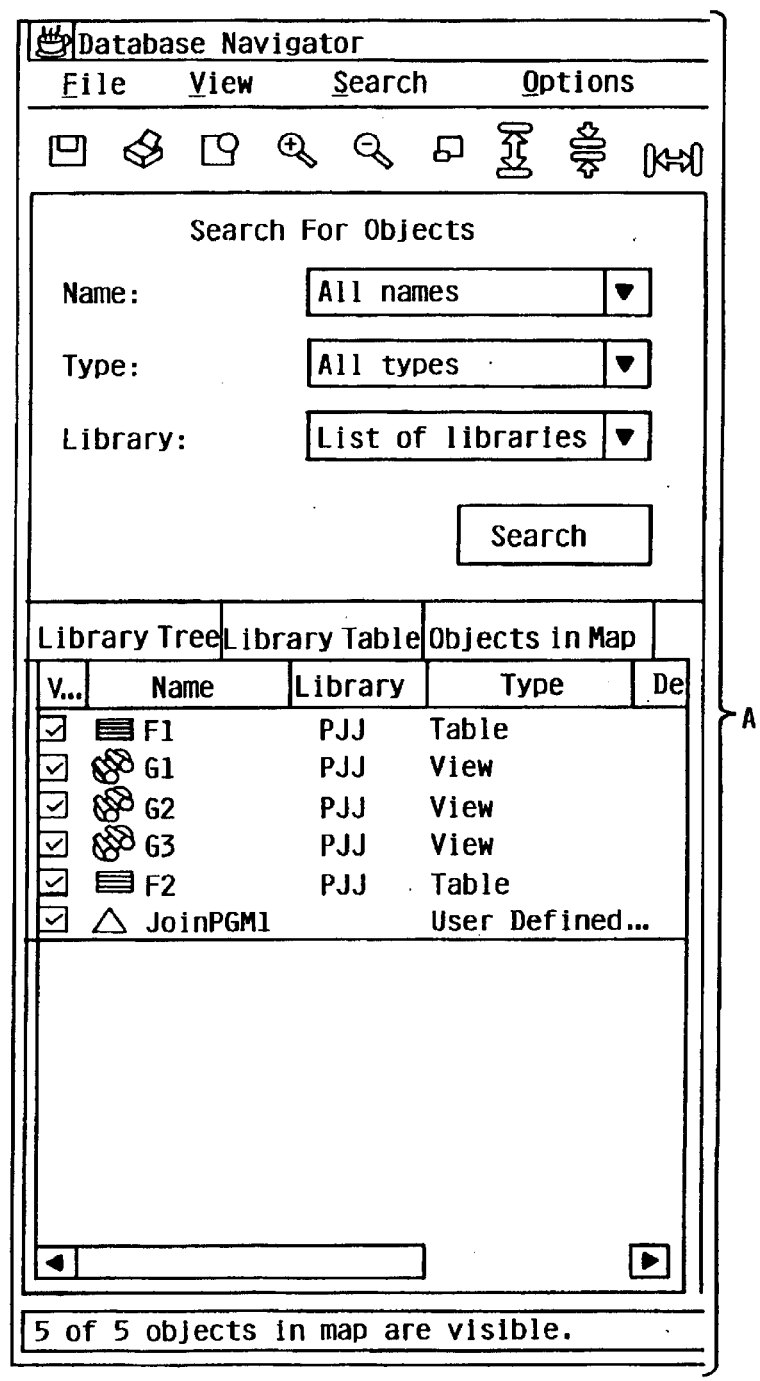
FIG. 5 illustrates the schema diagrammer display of the modified schema diagram map resulting from a user defining a user-defined relationship.
Figure 5B:
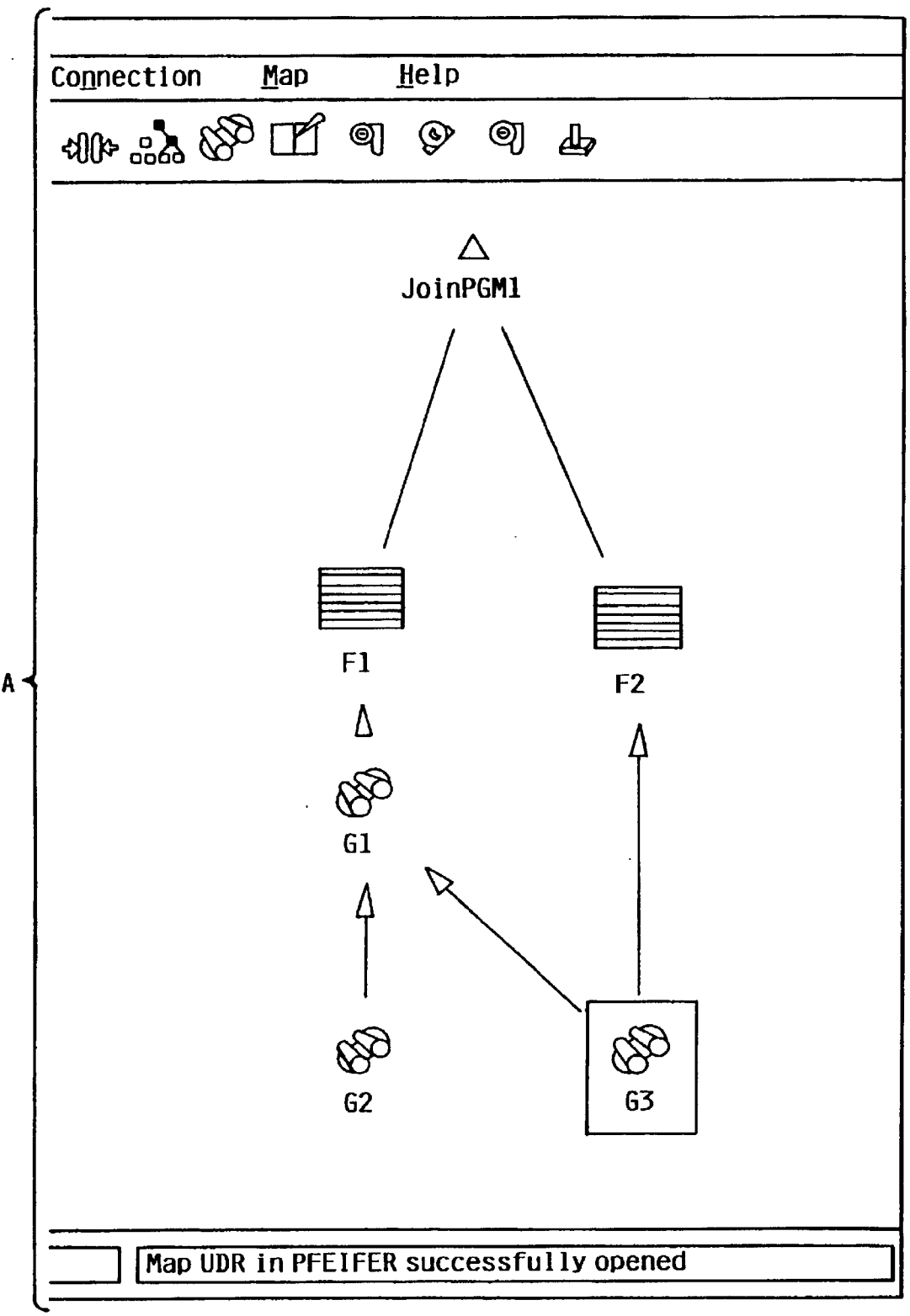

FIGS. 3, 4 and 5 are intended to convey, by means of an example, the functionality that in a preferred embodiment of the invention schema diagrammer 30 provides to the Operations Navigator or Database Navigator of the IBM AS/400 computer system. The screens illustrated in FIGS. 3, 4 and 5 represent the use and effect of GUI 32 on an exemplary database, as the user proceeds through the steps described above to add a UDR to an existing, i.e., previously-created, schema diagram map.

As described in the above-referenced co-pending patent application, the Database Navigator has a number of graphical elements with which the user, via a mouse, keyboard or other suitable input devices, can control schema diagrammer 30. In addition to the elements that are conventional to most windowing GUIs and familiar to those skilled in the art, these elements include a pull-down menu bar 66, an icon-based toolbar 68, an object entry window pane 70, an object list output window pane 72, and a graphical output window pane 74. To use the Database Navigator, a user can select information in pane 70 that identifies by its elements and/or location the database that the user desires to access, such as database object names, database object types, and a library name. After selecting or entering such information, the user can click on a "Search" button in pane 70 that causes schema diagrammer 30 to retrieve the database elements that meet the selected or entered criteria. The retrieved elements are displayed in pane 72. Pane 72 has several tabs from which the user can choose to display either a "Library Tree," a "Library Table" or the "Objects in Map." The tab relevant to the present invention, "Objects in Map," causes the database elements or objects that exist in a previously-created schema diagram map to be displayed. In the illustrated example, the objects have the following names: "F2", which is accompanied by an icon and a "type" name indicating that object F2 is a database table; "G3", which is accompanied by an icon and type name indicating that object G3 is a view; "G1", which is accompanied by an icon and type name indicating that object "G1" is another view; "F1", which is accompanied by an icon and type name indicating that object F1 is another table; and "G2", which is accompanied by an icon and type name indicating that object G2 is another view. In addition to the icon, object name and type name columns, another column indicates the library in which the object was found and a column that may contain an abbreviated description of the object.

In addition to the retrieved information displayed in tabular format in pane 72, the retrieved map is displayed in graphical format in pane 74. Accordingly, views G2 and G3 are indicated as related to one another by way of view G1, view G1 is indicated as being a view over table F1, and view G3 is indicated as being a view over table F2. The links or relationships between these objects are indicated by arrows.

In the example, the screen indicates that the user has selected the "Map" pull-down menu item on menu bar 66. Other such menu items include "File," "View," "Search," "Options" and "Help," which are not particularly relevant to the present invention and are described to some extent in the above-referenced co-pending application. To create a UDR, the user selects the "Create" option from among the options on the "Map" menu item. (Other options, which are not particularly relevant to the present invention, include "Show SQL" and "Delete.") Selecting "Create" causes a cascaded menu to appear. The user selects "User-Defined Relationship" from among the available options displayed. (Other options, which are not particularly relevant to the present invention, include "Table, "View," "Index," "Journal," "Trigger," "Alias" and "Constraint.") The user can alternatively access these functions or others by means of icon-based toolbar 68.

In response to the user selecting the "Create"/"User-Defined Relationships" menu item, GUI 32 causes the screen illustrated in FIG. 4 to be displayed. By means of this screen, the user can define the user-defined relationship to be added to the retrieved schema diagram map. This screen includes a pane 76 in which are displayed the database objects or elements described above in the same tabular format described above with respect to FIG. 3. Each object is accompanied by a checkbox that a user can select to indicate that that object is to be related to another object. The user thus checks the boxes indicating those objects that are to be related to one another by means of the UDR. In the example, tables F1 and F2 have been checked. The screen also includes an input text box 78 into which the user can type the name he desires to give to the new UDR that is being defined. In this example, the user has typed "Join-PGM1" into box 78. A brief description of the UDR can optionally be entered into a similar text box 80. The screen further includes selection boxes or circles that the user can select to indicate a choice of shape and a choice of color for the icon that is to represent the new UDR. Although any shape is suitable, in the illustrated embodiment of the invention the shapes may be selected from the group consisting of: circle, rectangle, square and triangle. Similarly, although any color is suitable, in the illustrated embodiment of the invention the color may be selected from the group consisting of: black, blue, green, red and yellow. In this example, the user has selected "Triangle" and "Green." When the user has completed these selections and entered a name and, optionally, a description, the user can click on an "OK" button. In response, schema diagrammer 30 modifies the schema diagram map to include the newly defined UDR, as illustrated in FIG. 5. Note that the screen shown in FIG. 5 is similar to that shown in FIG. 3 but includes the newly defined UDR in addition to the formal relationships (i.e., views G1, G2 and G3 in this example). Note that the UDR is represented graphically by a (green) triangle icon labeled with the name "JoinPGM 1" that indicates a join operation between tables F1 and F2. As explained above with regard to the software elements of the invention that effect this process of defining a UDR and adding it to a schema map, the join relationship that the user has defined is not part of the database, but rather is indicated in the system by UDR files 44 (FIG. 1) stored separately from the database files 34 and not accessible to or meaningful to database engine 28. Thus, when database engine 28 is used to, for example, query the database, it will not recognize a join between tables F1 and F2. Rather, this join is a UDR that is defined by the Database Navigator solely for the convenience of a database administrator or other user.

Figure 6A:
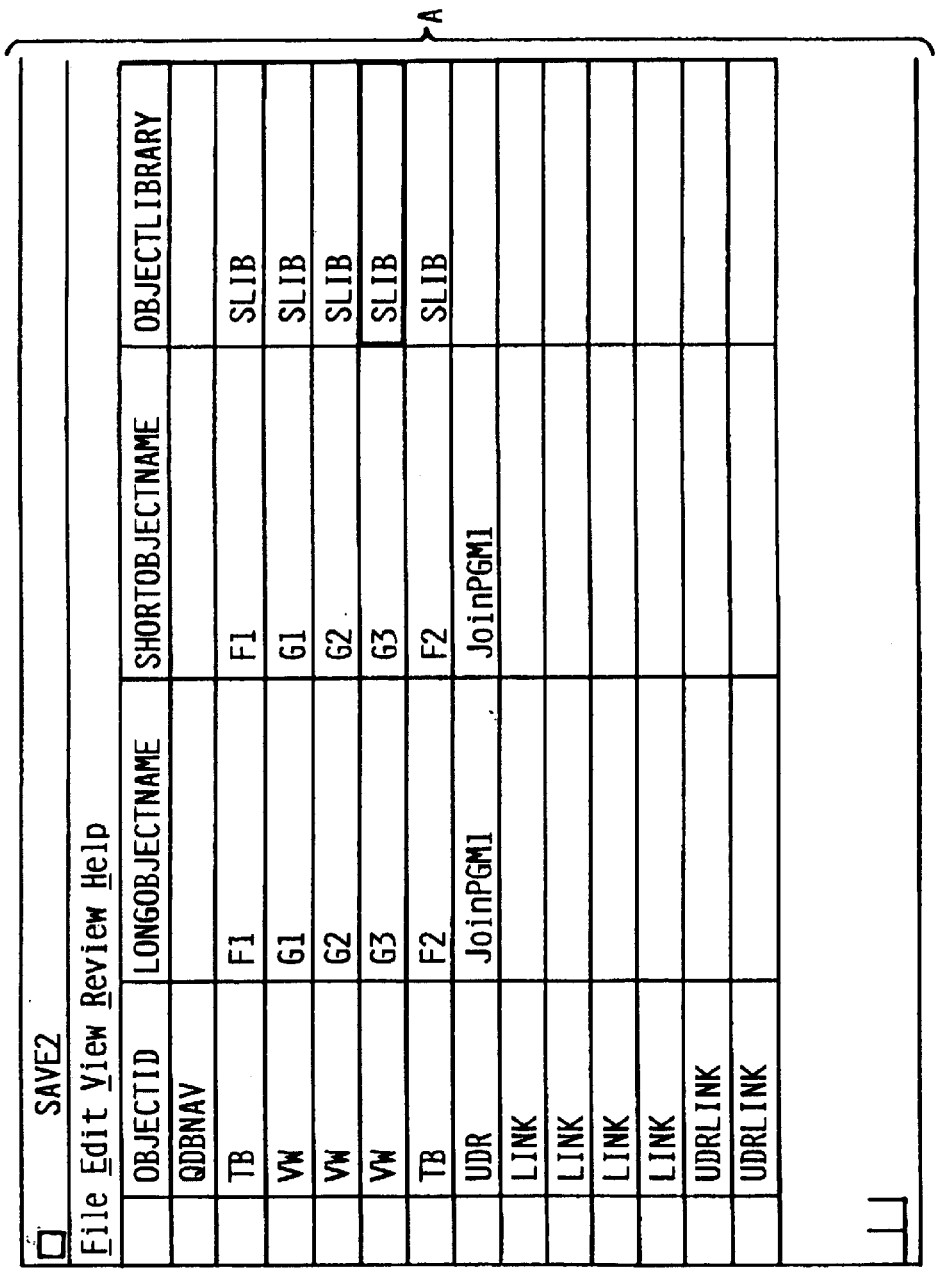
FIG. 6 illustrates a table in which is stored schema map information including user-defined relationships.
Figure 6B:
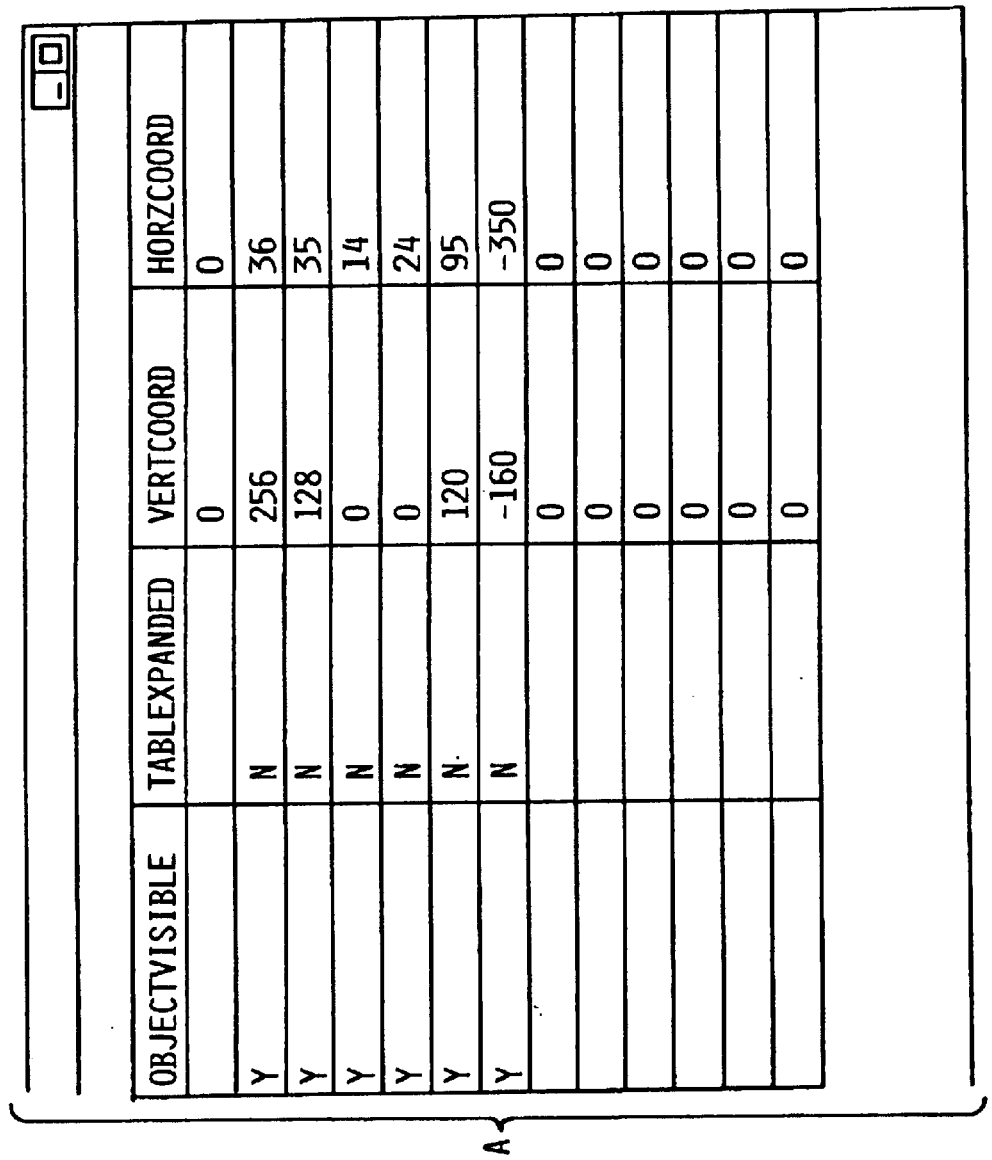

FIG. 6 illustrates an exemplary format in which the schema map information, including UDR files 44, may be maintained. Note that the format is a table having the following columns: "Object ID," which denotes the type of database object, such as a table or view; "LongObjectName" and "ShortObjectName," which denote the object name, such as "F1" in the example; "ObjectLibrary," which is the library in which the database objects are stored; "ObjectVisible," which is a flag indicating whether the object is to be displayed as part of the graphical schema map or left undisplayed; "TableExpanded," which is a flag indicating whether information in addition to that displayed in the table is available in an "expanded" table; and "VertCoord" and "HorizCoord," which indicate respectively the vertical and horizontal coordinates of the displayed database objects on the screen. Note that the objects contained in this table include not only the actual database objects but also the links between them (e.g., the arrows between the objects in FIGS. 4 and 5). As noted above, this table is stored on disk 20 in a manner that separates it from the database files 44 themselves. When a user invokes schema diagrammer 30 and causes it to display a schema diagram map, it uses the information in such a table to draw the corresponding graphical representation on the screen.

As illustrated by the above-described preferred embodiment, the present invention allows a user to modify a schema diagram map to include user-defined relationships. Including user-defined relationships along with the formal or programmatically defined relationships in a graphical schema diagram map enhances the ability of a database administrator or other user to manage and maintain the database.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

What is claimed is:

1. A method for adding user-defined database relationships to a schema diagram, comprising the steps of:

defining formal database relationships between objects in a database schema, said formal database relationships having an operational effect upon a database engine;

storing said formal database relationships in database files accessible by said database engine for said database engine to operate upon;

forming a graphical schema diagram map having graphical indicia representing said objects and graphical indicia representing said formal database relationships;

graphically displaying said retrieved schema diagram map for a user;

said user defining user-defined database relationships between said objects, said user-defined database relationships having no operational effect upon said database engine;

storing said user-defined database relationships separately from said database files, said user-defined database relationships inaccessible to said database engine;

modifying said retrieved schema diagram map to further include graphical indicia representing said user-defined database relationships; and graphically displaying said modified schema diagram map for a user.

2. The method claimed in claim 1, wherein said step of defining user-defined database relationships comprises the steps of:

querying said database files to determine said objects graphically displaying a list of said objects; and said user selecting a set of said objects related by one of said user-defined relationships; and said user selecting graphical indicia to represent a user-defined database relationship between objects of said set.

3. The method claimed in claim 2, wherein:

said step of said user selecting graphical indicia comprises said user selecting an icon shape and an icon color; and said step of graphically displaying said modified schema diagram map for a user said comprises displaying an icon having said shape and said color and graphically oriented on said schema diagram map to relate said objects of said set to one another.

4. The method claimed in claim 2, wherein:

said step of said user selecting graphical indicia comprises said user selecting a name; and said step of graphically displaying said modified schema diagram map for a user said comprises displaying an icon labeled with said name and graphically oriented on said schema diagram map to relate said objects of said set to one another.

5. A computer system having a database schema diagrammer, comprising:

a non-volatile storage medium having database files representing a database;

a main memory;

a programmed processor;

a database engine executable in said main memory under control of said programmed processor;

a schema diagrammer for forming a graphical schema diagram map having graphical indicia representing objects in said database and formal database relationships between said objects and for displaying said schema diagram map for a user, said formal database relationships having an operational effect upon said database engine, said schema diagrammer further for modifying said graphical schema diagram map to further include user-defined database relationships between said objects, said user-defined database relationships having no operational effect upon said database engine and stored in said database files separately from said formal database relationships and not accessible to said database engine.

6. The computer system claimed in claim 5, wherein said schema diagrammer includes a user interface that queries said database files to determine said objects and graphically displays a list of said objects from which said user can select a set of said objects related by one of said user-defined relationships.

7. The computer system claimed in claim 6, wherein said user interface provides graphical indicia from which a user can select to represent a user-defined database relationship between objects of said set.

8. The computer system claimed in claim 7, wherein said user can select an icon shape and an icon color.

9. The computer system claimed in claim 7, wherein said user can select an icon name.

10. A computer program product for a computer system having a database, comprising at least one signal-bearing medium usable by said computer system, the signal-bearing medium carrying thereon:

a schema diagrammer for forming a graphical schema diagram map having graphical indicia representing objects in said database and formal database relationships between said objects and for displaying said schema diagram map for a user, said formal database relationships having an operational effect upon a database engine, said schema diagrammer further for modifying said graphical schema diagram map to further include user-defined database relationships between said objects, said user-defined database relationships having no operational effect upon said database engine and stored in said database separately from said formal database relationships and not accessible to said database engine.

11. The computer program product claimed in claim 10 wherein said schema diagrammer includes a user interface that queries said database files to determine said objects and graphically displays a list of said objects from which said user can select a set of said objects related by one of said user-defined relationships.

12. The computer program product claimed in claim 11, wherein said user interface provides graphical indicia from which a user can select to represent a user-defined database relationship between objects of said set.

13. The computer program product claimed in claim 12, wherein said user can select an icon shape and an icon color.

14. The computer program product claimed in claim 12, wherein said user can select an icon name.

15. The method claimed in claim 1, wherein the operational effect comprises changing how the database engine stores, retrieves and queries the objects in the data set.

16. The method claimed in claim 1, further comprising retrieving a previously-created schema diagram map.

* * * * *